(12) United States Patent
Schulman

(10) Patent No.: US 11,551,082 B2
(45) Date of Patent: Jan. 10, 2023

(54) PARALLEL SEQUENCE REDUCTIONS WITH RECURSIVE NEURAL NETWORKS

(71) Applicant: KONINKLIJKE PHILIPS N.V., Eindhoven (NL)

(72) Inventor: Daniel Jason Schulman, Jamaica Plain, MA (US)

(73) Assignee: Koninklijke Philips N.V., Eindhoven (NL)

( * ) Notice: Subject to any disclaimer, the term of this patent is extended or adjusted under 35 U.S.C. 154(b) by 554 days.

(21) Appl. No.: 16/712,005

(22) Filed: Dec. 12, 2019

(65) Prior Publication Data

US 2020/0226466 A1 Jul. 16, 2020

Related U.S. Application Data

(60) Provisional application No. 62/790,594, filed on Jan. 10, 2019.

(51) Int. Cl.
*G06N 3/08* (2006.01)
*G06N 3/04* (2006.01)
*G06N 7/04* (2006.01)

(52) U.S. Cl.
CPC ............. *G06N 3/08* (2013.01); *G06N 3/0445* (2013.01); *G06N 7/046* (2013.01)

(58) Field of Classification Search
CPC ......... G06N 3/08; G06N 3/0445; G06N 7/046
USPC ............................................. 706/25
See application file for complete search history.

(56) References Cited

U.S. PATENT DOCUMENTS 11,386,644 B2 * 7/2022 Delaye .............. G06F 17/153
2019/0197083 A1 * 6/2019 Chen ....................... G06N 3/04

OTHER PUBLICATIONS

Zlateski, et al., "Recursive Training of 2D-3D Convolutional Networks for Neuronal Boundary Detection", NIPS 2015 (Year: 2015).*

* cited by examiner

*Primary Examiner* — Tsu-Chang Lee

(57) ABSTRACT

A parallel recursive neural network, including: a memory configured to store data and processing instructions; and a parallel computer processor configured to: receive a set of input values; apply a recursive layer function individually on each of the set of input values in parallel to produce a set of hidden states; apply a reduction function on pairs of adjacent hidden states in the set of hidden states in parallel to produce a new set of hidden states; and repeat applying the reduction function of pairs of adjacent states in the new set of hidden states in parallel until a single output hidden state results.

21 Claims, 3 Drawing Sheets

PARALLEL SEQUENCE REDUCTIONS WITH RECURSIVE NEURAL NETWORKS

CROSS-REFERENCE TO PRIOR APPLICATIONS

This patent application claims the priority benefit under 35 U.S.C. § 119(e) of U.S. Provisional Application No. 62/790,594, filed on Jan. 10, 2019, the contents of which are herein incorporated by reference.

TECHNICAL FIELD

Various exemplary embodiments disclosed herein relate generally to methods for parallel sequence reductions for machine learning with recursive neural networks.

BACKGROUND

In many machine learning applications in healthcare, the input is an arbitrary-length sequence of elements, including classification of waveform data, and natural language processing of clinical notes. Recurrent neural networks (RNNs) are often effective, but can be difficult to train to high accuracy on long sequences with long-range dependencies and difficult to implement efficiently on highly-parallel processing architectures such as GPUs. Methods and systems based on recurrent neural network (RNN) models are widely applied, but have high computational cost, especially on long sequences, limiting their applicability in resource-constrained settings.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

A parallel recursive neural network, including: a memory configured to store data and processing instructions; and a parallel computer processor configured to: receive a set of input values; apply a recursive layer function individually on each of the set of input values in parallel to produce a set of hidden states; apply a reduction function on pairs of adjacent hidden states in the set of hidden states in parallel to produce a new set of hidden states; and repeat applying the reduction function of pairs of adjacent states in the new set of hidden states in parallel until a single output hidden state results.

Various embodiments are described, wherein the recursive layer function includes applying a convolution operation.

Various embodiments are described, wherein the convolution operation has a width of 1 and a stride of 1.

Various embodiments are described, wherein the reduction function includes applying a convolution operation.

Various embodiments are described, wherein the convolution operation has a width of 2 and a stride of 2.

Various embodiments are described, wherein an activation function is further applied to the output of the convolution operation.

Various embodiments are described, wherein the reduction function pads the hidden states if the number of hidden states is not even.

Further various embodiments relate to a parallel recursive neural network configured to receive N inputs and to produce N outputs, including: a memory configured to store data and processing instructions; and a parallel computer processor configured to: receive a set of N input values; apply a recursive layer function individually on each of the set of input values in parallel to produce a set of hidden states; apply a reduction function on pairs of adjacent hidden states in the set of hidden states in parallel to produce a new set of hidden states and to produce a portion of the output states; and repeat applying the reduction function using internal dilation to produce all N output states.

Various embodiments are described, wherein the recursive layer function includes applying a convolution operation.

Various embodiments are described, wherein the convolution operation has a width of 1 and a stride of 1.

Various embodiments are described, wherein the reduction function includes applying a convolution operation.

Various embodiments are described, wherein the convolution operation has a width of 2 and a stride of 1 and a dilation d.

Various embodiments are described, wherein the value of d is doubled after the convolution operation is applied.

Various embodiments are described, wherein an activation function is further applied to the output of the convolution operation.

Various embodiments are described, wherein the reduction function pads the hidden states based upon a dilation parameter d.

Further various embodiments relate to a method for producing an output from a set of input values using a parallel recursive neural network, including: receiving a set of input values; applying a recursive layer function individually on each of the set of input values in parallel to produce a set of hidden states; applying a reduction function on pairs of adjacent hidden states in the set of hidden states in parallel to produce a new set of hidden states; and repeating applying the reduction function of pairs of adjacent states in the new set of hidden states in parallel until a single output hidden state results.

Various embodiments are described, wherein the recursive layer function includes applying a convolution operation.

Various embodiments are described, wherein the convolution operation has a width of 1 and a stride of 1.

Various embodiments are described, wherein the reduction function includes applying a convolution operation.

Various embodiments are described, wherein the convolution operation has a width of 2 and a stride of 2.

Various embodiments are described, wherein an activation function is further applied to the output of the convolution operation.

Various embodiments are described, wherein the reduction function pads the hidden states if the number of hidden states is not even.

Further various embodiments relate to a method for producing N outputs from a set of N input values using a parallel recursive neural network, including: receiving a set of N input values; applying a recursive layer function individually on each of the set of input values in parallel to produce a set of hidden states; applying a reduction function on pairs of adjacent hidden states in the set of hidden states in parallel to produce a new set of hidden states and to produce a portion of the output states; and repeating applying the reduction function using internal dilation to produce all N output states.

Further various embodiments relate to a wherein the recursive layer function includes applying a convolution operation.

Further various embodiments relate to a wherein the convolution operation has a width of 1 and a stride of 1.

Further various embodiments relate to a wherein the reduction function includes applying a convolution operation.

Further various embodiments relate to a wherein the convolution operation has a width of 2 and a stride of 1 and a dilation d.

Further various embodiments relate to a wherein the value of d is doubled after the convolution operation is applied.

Further various embodiments relate to a wherein an activation function is further applied to the output of the convolution operation.

Further various embodiments relate to a wherein the reduction function pads the hidden states based upon a dilation parameter d.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
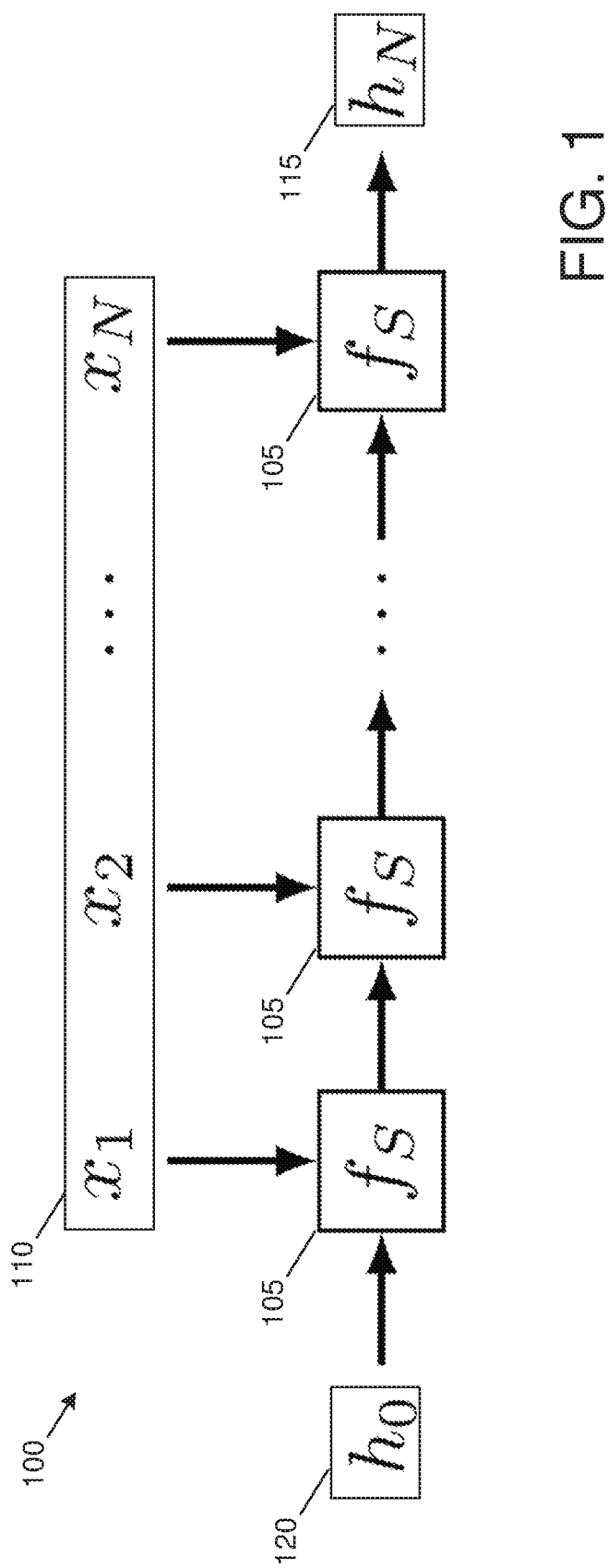
FIG. 1 illustrates a typical RNN architecture that implements sequential reduction.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Many potential health-related machine learning applications (as well as in non-health-related application domains) involve sequence learning tasks: that is, tasks in which the goal is to approximate some function which takes as input a sequence of elements that may be of arbitrary length and/or varying length. The output of the function may variously be one of a set of discrete classes or a probability distribution over those classes (in a classification task), some continuous value or values (in a regression task), a sequence of equal length (e.g., in a prediction task), or other possibilities not considered here.

For machine learning problems with complex high-dimensional inputs, and when sufficiently large training datasets are available, deep learning models are often state-of-the-art. The most widely-applied class of deep learning model for sequence learning are Recurrent Neural Networks (RNNs), which, when applied to sequential input, learn an arbitrary function that takes as input a single input element and a fixed-dimensional hidden state and outputs a new hidden state. This function is applied sequentially to all elements of a sequence to yield a single output or multiple outputs. Numerous variants of RNNs have been developed, typically with the goal of improving performance (either convergence or other properties of training, accuracy once trained, or both) on long sequences. The most common are Long Short-Term Memory Networks (LSTMs) and Gated Recurrent Units (GRUs).

The advantages of RNNs, relative to other deep learning models, are relative simplicity (for example, a deep convolutional network requires specification of many more architectural details), and adaptability to arbitrary or varying sequence lengths (for example, deep convolutional networks assume a fixed sequence length).

Existing RNN models have two primary disadvantages. First, RNNs are difficult to train on long sequences, with long-range dependencies in data (i.e., situations in which the correct output depends in part or in whole on inputs that are many elements away), and RNNs typically have difficulty converging (taking many training steps, failing to train to high accuracy, or both) and poor performance on test data in such scenarios.

Second, RNNs are computationally difficult, resulting is slow training and inference relative to other deep learning models (e.g., deep convolutional networks). Efficient computation of large neural network models relies on highly-parallel processing hardware such as graphics processing units (GPUs), although note that similarly parallel (albeit more resource-constrained) processing hardware is now available in forms that are amenable to, e.g., handheld use (such as the Intel Movidius compute stick). Such hardware achieves good performance by extensive use of "single-instruction multiple-dispatch" (SIMD) computation; i.e., the same computation performed in parallel on multiple different units of data. RNN models are difficult to parallelize, as they rely on a complex function applied sequentially to each element of the input; each step relies on the output of the previous step and they cannot be performed in parallel.

A parallel recursive neural network (PRNN) is disclosed herein that addresses both problems discussed above. It is noted that it is possible to apply a function repeatedly to a sequence (as current RNNs do) in multiple arrangements, and that sequential application, to one element of the input sequence at a time, is related to both disadvantages of RNNs. Thus, the PRNN introduces a new class of machine learning model which also applies a function repeatedly to an input sequence, but across all elements in parallel.

FIG. 1 illustrates a typical RNN architecture that implements sequential reduction. The RNN 100 receives an input that is in the form of an arbitrary-length sequence of elements $x_1, x_2, \ldots, x_N$ 110 the desired output in this situation is a single fixed-dimensional element $y=h_N$ 115. The RNN includes a functional element $f_s$ that is repeated applied to each input and prior hidden states. Further, an initial hidden state $h_0$ 120 may be input which may be any arbitrary value. In other RNNs, multiple outputs may be produced at each functional element $f_s$.

The PRNN is a class of machine learning model applicable to sequence learning. These models are based on two insights.

First, where traditional RNN models apply a function repeatedly to a sequence, reducing it to a single output (at the final step or in other cases multiple outputs with one produced at each step) by applying the function to each element of the input sequentially and in order, it is also possible to reduce a sequence to a single output by applying a function repeatedly to adjacent pairs of elements in parallel, reducing the sequence length by half at each step.

Second, a parallel reducing function, as described above, can be implemented using convolutional operations (typically used in deep convolutional neural networks), which are computationally efficient on GPUs and other parallel computing hardware, in order to apply the function to an entire sequence in parallel.

Figure 2:
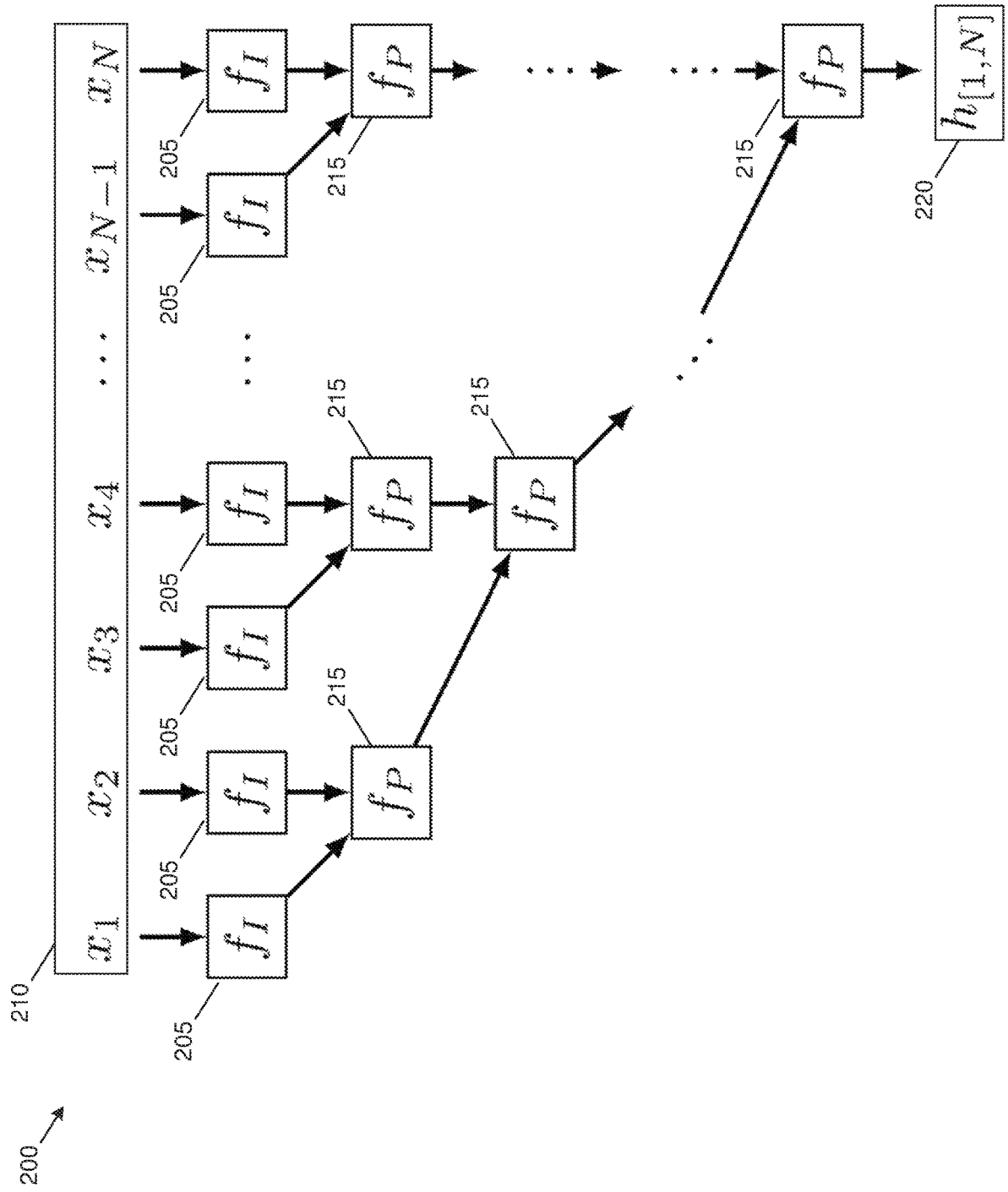
FIG. 2 illustrates an example of an architecture of a parallel recursive neural network (PRNN)

FIG. 2 illustrates an example of an architecture of a PRNN. The PRNN reduces an input sequence by combining adjacent hidden states, as a binary tree as shown in FIG. 2. The PRNN includes two functions: $f_r$ 205, which inputs a single element $x_n$ 210 and produces a hidden state $h_{[n,n]}$ that is a recursive layer, which applies a cell repeatedly to a sequence; and $f_p$ 215, which inputs two hidden states $h_{[a,b-1]}$ and $h_{[b,c]}$ and produces a single hidden state $h_{[a,c]}$, where the notation $h_{[i,j]}$ indicates a hidden state formed from reducing elements i through j of the input sequence, and a, b, and c are indices of the input sequence where a<b≤c, that is a convolutional cell, which has the effect of applying a reducing function, in parallel, across pairs of elements in a sequence. The final output from the last $f_p$ 215 in the last layer is $h_{[1,N]}$ 220.

Optimization in RNNs and other neural network models relies on (stochastic) gradient descent, with a gradient derived by repeated application of the chain rule (backpropagation). RNNs have a backpropagation depth (i.e., the length of a path in the diagrams) that grows linearly with sequence length. Because each application of the chain rule multiplies per-step gradients, the total gradients can rapidly become unstable, increasing exponentially (exploding) or decreasing exponentially (vanishing) with sequence length. With the PRNN, backpropagation depth grows logarithmically with sequence length, ameliorating vanishing/exploding gradients.

Since $f_r$ and $f_p$ are applied in parallel on a sequence, it is possible to implement them efficiently using convolutional layers. The implementation details below assume a software framework that provides: linear algebra and similar operations (e.g., matrix multiplications), with specific operations identified as needed; automatic computation of gradients via reverse-mode automatic differentiation; and optimization of a model based on gradient descent, given automatically derived gradients. Examples of suitable frameworks include Tensorflow and Pytorch.

Pseudocode for the simplest possible convolutional cell SimpleCell is shown below. The function SimpleCell takes inputs and parameters including:
- a sequence of hidden states (h, a 2-dimensional array arranged as [sequence,feature]);
- a set of model parameters ($\theta_P$); and
- additional parameters (s, d) to be supplied by the recursive layer, controlling how the cell is applied to the sequence and which pairs of hidden states are combined.

It is assumed that the framework used for implementation provides:
- A 1-dimensional cross-correlation operation (typically referred to as "convolution" in machine learning literature and software), with specified kernel width, stride, and dilation. In typical frameworks, this operations require specification of the number of input and output channels; these are suppressed here to avoid clutter, and will always be the same as the hidden state size.
- One or more nonlinear activation functions (e.g., tan h, rectified linear), applied elementwise.

The function SimpleCell calculates a simple convolution on the set of hidden states h using the set of model parameters $\theta_P$. Then an activation function is applied to the output of the convolution to produce the output z of the function SimpleCell. Other more complex cells may be used in the PRNN depending upon the specific application of the PRNN.

```
Function SimpleCell(h, θ_P, s, d)
    y ← Conv(h, θ_P, width=2, stride=s, dilate=d)
    z ← Activation(y)
    Return z
end function
```

There are multiple different types of recursive layers, each of which is suited for a different subset of sequence learning tasks. Three examples of such recursive layers will now be presented. A sequence reduction layer Reduce, with pseudocode shown below, reduces an input sequence of arbitrary or varying length to a single hidden state and is appropriate, for example, in a sequence classification task and implements the reduction process shown in FIG. 2. In addition to the operations used above, the following are assumed:
- a convolutional cell, either the simple cell shown above or a different variant depending upon the specific application of the PRNN; and
- a padding operation, which adds an arbitrary number of zero elements to the left or right.

The Reduce function first takes the inputs x and applies a convolution function on the inputs using the set of model parameters $\theta_f$. Then while the size of the hidden states h is greater than 1, it is determined if the hidden states need to be padded and if so, zeros are added as padding. Then the Cell function (such as SimpleCell described above or any other suitable cell function) is then applied to adjacent hidden states, and then a new set of hidden states is generated. This is repeated until the number of new hidden states is 1, and then the value of h is the output of the PRNN.

```
function Reduce(x, θ_f, θ_P)
    h ← Conv(x, θ_f, width=1, stride=1, dilate=1)
    while Dim(h, 0)>1 do
        m ← Dim(h, 0) mod 2
        if m>0 then
            h ← Pad(h, left=m, right=0)
        end if
        h ← Cell(h, θ_P, stride=2, dilate=1)
    end while
    return h
end function
```

Next, a causal mapping layer CausalMap is described that takes as input an arbitrary/varying length sequence, and outputs a sequence of hidden states of the same length, enforcing the constraint that each output may depend only on inputs that occur at the same or earlier positions in the sequence. This approach uses dilated convolutions rather than strided convolutions. It is appropriate, for example, in a prediction task, where the output is the predicted next element of the input sequence. In addition to the operations used above, the concatenation of arrays along arbitrary dimension is assumed.

The CausalMap function first takes the inputs x and applies a convolution function on the inputs using the set of model parameters $\theta_I$. The initial value of an output vector is then stored and the value of d is initialized. Then while the size of the hidden states h is greater than 2d, hidden states are padded. Then the Cell function (such as SimpleCell described above or any other cell function) is then applied to hidden states using a stride of 1 and dilation of d, and then a new set of hidden states is generated. A new set of hidden states are added to the output y. The value of d is then double. This is repeated until 2d is less than or equal to the number of hidden states. Then if 2d is less than or equal to the dimension of the hidden states, a final Cell function is applied to the hidden states and the output concatenated to the output.

```
function CausalMap(x, θ_I, θ_P)
    h ← Conv(x, θ_I, width=1, stride=1, dilate=1)
    y ← h[0..1]
    d ← 1
    while 2d ≤ Dim(h, 0) do
        h ← Pad(h, left=d, right=0)
        h ← Cell(h, θ_P, stride=1, dilate=d)
        y ← Concat(y, h[d..2d], dim=0)
        d ← 2d
    end while
    if 2d ≤ Dim(h, 0) then
        h ← Cell(h, θ_P, stride=1, dilate=d)
        y ← Concat(y, h, dim=0)
    end if
    return y
end function
```

Finally, in a third example, a bidirectional causal mapping layer BiCausalMap also takes a sequence as input and outputs a sequence of the same length, but without the constraints as above; each member of the output sequence may depend on the entire input sequence. It is appropriate, for example, in a sequence tagging task (e.g. part of speech tagging in natural language processing) that assigns a label to each element of a sequence. In addition to the operations used above, an operation Reverse that reverses the order of items in an input array, along an arbitrary dimension is assumed.

The BiCausalMap function uses and builds upon the function CausalMap described above. First CausalMap is applied to the input x using set of parameters $\theta_{IF}$ and $\theta_{PF}$ to give results $y_F$, i.e., forward results. Then the input x is reversed giving $x_B$. The reversed input xB is input to the function CausalMap, that uses a different set of parameters $\theta_{IB}$ and $\theta_{PB}$ to produce results y. The values of $y_B$ are then reversed and concatenated with the values $y_F$ to produce the final output values y.

```
function BiCausalMap(x, θ_IF, θ_IB, θ_PF, θ_PB)
    y_F ← CausalMap(x, θ_IF, θ_PF)
    x_B ← Reverse(x, dim=0)
    y_B ← CausalMap(x_B, θ_IB, θ_PB)
    y_B ← Reverse(y_B, dim=0)
    y ← Concat(y_F, y_B, dim= 1)
    return y
end function
```

More elaborate convolutional cells may be substituted for the simple cell, in any of the recursive layers given above. The two variations given below add residual links and gating mechanisms, two architectural details that have been used to improve performance of other deep neural networks, and may offer similar performance improvements in PRNNs when sequence length or complexity is sufficiently high. For the gated cell, we assume the framework implements the elementwise sigmoid function: $f(x)=1/(1+\exp(-x))$.

```
function ResidualCell(h, θ_L, θ_R, s, d)
    l ← Conv(h, θ_L, width=2, stride=s, dilate=d)
    r ← Conv(h, θ_R width=2, stride=s, dilate=d)
    r ← Activation(r)
    y = l + r
    Return y
end function
function GatedCell(h, θ_L, θ_R, θ_G, s, d)
    l ← Conv(h, θ_L, width=2, stride=s, dilate=d)
    r ← Conv(h, θ_R width=2, stride=s, dilate=d)
    r ← Activation(r)
    g ← Conv(h, θ_G, width=2, stride=s, dilate=d)
    g ← Sigmoid(g)
    y = l*g + r*(1-g)
    Return y
end function
```

Several modifications may be made to any of the three convolutional cell types shown here, with the goal of increasing convergence speed and reliability during training (normalization) or of improving generalization error beyond the training set (regularization), including: layer normalization, recurrent batch normalization, and other normalization techniques applicable to a recurrent model; and weight dropout, recurrent dropout, and other regularization techniques.

Finally, the depth of a PRNN model may be increased in two ways. First, the "inner depth" may be increased by adding additional convolutional layers within a cell, resulting in deep plain, deep residual, and deep gated cells. Second, the "outer depth" may be increased by stacking multiple recursive layers, where the output of one layer is a sequence, and the input to the next. This results in three types of deep recursive layers.

The first is a deep sequence reduction layer, including one or more bidirectional causal mapping layers followed by a sequence reduction layer. Linear downsampling layers (implemented as width-one convolutions) may be included after each bidirectional mapping layer, if needed. The second is a deep causal mapping layer, including two or more causal mapping layers in sequence. The third is a deep bidirectional causal mapping layer, including two or more bidirectional causal mapping layers in sequence. As above, linear downsampling may be needed.

In one application of the PRNN, the PRNN may be a component of a system to perform numerous healthcare-related machine learning tasks. Present tasks for which a PRNN appears well-suited are those in which (1) the data involves long and complex sequences; and (2) it is desired to operate under resource-constraints, with a fast model capable of executing either on large scale or in resource-constrained (e.g. handheld) devices. One potential embodiment includes the classification of a variety of physiological signals, including:

Classification of electrocardiogram (ECG) signals to identify arrhythmia, myocardial infarction, atrial fibrillation, or other abnormal patterns. These signals may be collected and processed in a resource-constrained wearable device.

Classification of electroencephalogram (EEG) signals to identify pathologies, predict epileptic seizures, or identify sleep states (for example to monitor patient sedation levels). These signals may be collected and processed in a resource-constrained wearable device.

Classification of acoustic signals to identify pathological heart sounds or respiratory problems. These signals may be collected and processed in a resource-constrained handheld device (e.g. a "smart stethoscope").

Another potential embodiment includes large-scale clinical natural language processing (NLP), including:

Clinical concept and relation extraction in notes.

Automated de-identification of clinical notes.

The PRNN described herein describes a new RNN architecture that allows for a vast improvement in the speed in training and using RNNs. Because RNNs were have traditionally been computed sequentially, they have not been able to take advantage of parallel processing in order to more quickly train and use RNNs. The PRNN uses a parallel architecture that allows for the use of parallel processing in the training and implementation of the PRNN. This is a technological improvement over existing serial RNNs. It allows for the implementation of the PRNN on devices that have limited processing resources. This will allow for RNNs using the PRNN architecture to be implemented in for example mobile device or internet of things (IoT) devices that often have limited processing capability. It will also allow for RNNs to be deployed on wearable devices that typically have significantly constrained processing resources. The PRNN is an improvement over current computer implementation of RNNs and is an improvement in the operation of a computer.

Figure 3:
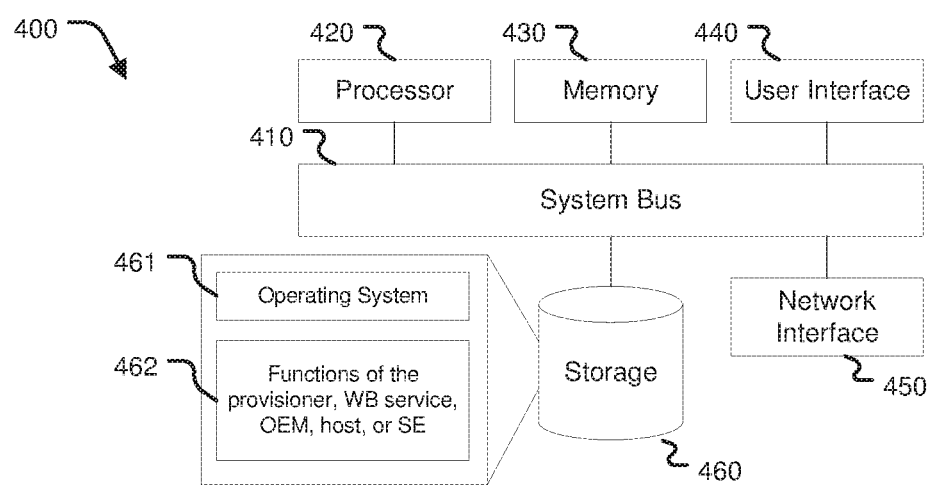
FIG. 3 illustrates an exemplary hardware diagram for implementing the PRNN.

FIG. 3 illustrates an exemplary hardware diagram 300 for implementing the PRNN. More specifically, the hardware diagram of FIG. 3 may describe various instances of parallel computing elements that are used to implement the PRNN. As shown, the device 300 includes a processor 320, memory 330, user interface 340, network interface 350, and storage 360 interconnected via one or more system buses 310. It will be understood that FIG. 3 constitutes, in some respects, an abstraction and that the actual organization of the components of the device 300 may be more complex than illustrated.

The processor 320 may be any hardware device capable of executing instructions stored in memory 330 or storage 360 or otherwise processing data. As such, the processor may include a microprocessor, a graphics processing unit (GPU), field programmable gate array (FPGA), application-specific integrated circuit (ASIC), any processor capable of parallel computing, or other similar devices.

The memory 330 may include various memories such as, for example L1, L2, or L3 cache or system memory. As such, the memory 330 may include static random-access memory (SRAM), dynamic RAM (DRAM), flash memory, read only memory (ROM), or other similar memory devices.

The user interface 340 may include one or more devices for enabling communication with a user. For example, the user interface 340 may include a display, a touch interface, a mouse, and/or a keyboard for receiving user commands. In some embodiments, the user interface 340 may include a command line interface or graphical user interface that may be presented to a remote terminal via the network interface 350.

The network interface 350 may include one or more devices for enabling communication with other hardware devices. For example, the network interface 350 may include a network interface card (NIC) configured to communicate according to the Ethernet protocol or other communications protocols, including wireless protocols. Additionally, the network interface 350 may implement a TCP/IP stack for communication according to the TCP/IP protocols. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon with the processor 320 may operate. For example, the storage 360 may store a base operating system 361 for controlling various basic operations of the hardware 300. The storage 361 may store instructions for carrying out the functions of the of the PRNN as described herein.

It will be apparent that various information described as stored in the storage 360 may be additionally or alternatively stored in the memory 330. In this respect, the memory 330 may also be considered to constitute a "storage device" and the storage 360 may be considered a "memory." Various other arrangements will be apparent. Further, the memory 330 and storage 360 may both be considered to be "non-transitory machine-readable media." As used herein, the term "non-transitory" will be understood to exclude transitory signals but to include all forms of storage, including both volatile and non-volatile memories.

While the host device 300 is shown as including one of each described component, the various components may be duplicated in various embodiments. For example, the processor 320 may include multiple microprocessors that are configured to independently execute the methods described herein or are configured to perform steps or subroutines of the methods described herein such that the multiple processors cooperate to achieve the functionality described herein. Further, where the device 300 is implemented in a cloud computing system, the various hardware components may belong to separate physical systems. For example, the processor 320 may include a first processor in a first server and a second processor in a second server.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A parallel recursive neural network for performing a machine learning task, the parallel recursive neural network comprising:

a memory configured to store data and processing instructions; and a parallel computer processor configured to:

receive a set of input values;

apply a recursive layer function individually on each input value of the set of input values in parallel to produce a set of hidden states;

apply a reduction function on pairs of adjacent hidden states in the set of hidden states in parallel to produce a new set of hidden states having a reduced number of hidden states;

repeat applying the reduction function of pairs of adjacent states in the new set of hidden states in parallel until a single output hidden state results; and output a value of the single output hidden state from the recursive neural network.

2. The parallel recursive neural network claim 1, wherein the recursive layer function includes applying a convolution operation.

3. The parallel recursive neural network of claim 2, wherein the convolution operation has a width of 1 and a stride of 1.

4. The parallel recursive neural network claim 1, wherein the reduction function includes applying a convolution operation.

5. The parallel recursive neural network of claim 4, wherein the convolution operation has a width of 2 and a stride of 2.

6. The parallel recursive neural network of claim 4, wherein an activation function is further applied to the output of the convolution operation.

7. The parallel recursive neural network of claim 1, wherein the reduction function pads the hidden states if the number of hidden states is not even.

8. A parallel recursive neural network configured to receive N inputs and to produce N outputs for performing a machine learning task, comprising:

a memory configured to store data and processing instructions; and a parallel computer processor configured to:
receive a set of N input values;
apply a recursive layer function individually on each input value of the set of input values in parallel to produce a set of hidden states;
apply a reduction function on pairs of adjacent hidden states in the set of hidden states in parallel to produce a new set of hidden states and to produce a portion of the N outputs; and
repeat applying the reduction function using internal dilation to produce all N outputs from the recursive neural network.

9. The parallel recursive neural network claim 8, wherein the recursive layer function includes applying a convolution operation.

10. The parallel recursive neural network claim 8, wherein the reduction function includes applying a convolution operation.

11. The parallel recursive neural network of claim 10, wherein the convolution operation has a width of 2 and a stride of 1 and a dilation d, and wherein a value of d is doubled after the convolution operation is applied.

12. The parallel recursive neural network of claim 10, wherein an activation function is further applied to the output of the convolution operation.

13. The parallel recursive neural network of claim 8, wherein the reduction function pads the hidden states based upon a dilation parameter d.

14. A method for producing an output for performing a machine learning task from a set of input values using a parallel recursive neural network, the method comprising:

receiving a set of input values;
applying a recursive layer function individually on each input value of the set of input values in parallel to produce a set of hidden states;
applying a reduction function on pairs of adjacent hidden states in the set of hidden states in parallel to produce a new set of hidden states having a reduced number of hidden states;
repeating applying the reduction function of pairs of adjacent states in the new set of hidden states in parallel until a single output hidden state results; and
outputting a value of the single output hidden state as the output from the set of input values of the recursive neural network.

15. The method claim 14, wherein at least one of the recursive layer function and the reduction function includes applying a convolution operation.

16. The method of claim 15, wherein an activation function is further applied to the output of the convolution operation.

17. The method of claim 14, wherein the reduction function pads the hidden states when the number of hidden states is not even.

18. A method for producing N outputs for performing a machine learning task from a set of N input values using a parallel recursive neural network, the method comprising:

receiving a set of N input values;
applying a recursive layer function individually on each input value of the set of input values in parallel to produce a set of hidden states;
applying a reduction function on pairs of adjacent hidden states in the set of hidden states in parallel to produce a new set of hidden states and to produce a portion of the N outputs; and
repeating applying the reduction function using internal dilation to produce all N outputs from the recursive neural network.

19. The method claim 18, wherein at least one the recursive layer function and the reduction function includes applying a convolution operation.

20. The method of claim 19, wherein an activation function is further applied to the output of the convolution operation.

21. The method of claim 18, wherein the reduction function pads the hidden states based upon a dilation parameter d.

* * * * *